(12) United States Patent
Wright

(10) Patent No.: US 8,231,084 B2
(45) Date of Patent: Jul. 31, 2012

(54) AIRCRAFT WING

(75) Inventor: Philip Wright, Bristol (GB)

(73) Assignee: Airbus Operations Limited, Bristol (GB)

( * ) Notice: Subject to any disclaimer, the term of this patent is extended or adjusted under 35 U.S.C. 154(b) by 290 days.

(21) Appl. No.: 12/453,502

(22) Filed: May 13, 2009

(65) Prior Publication Data

US 2009/0302169 A1    Dec. 10, 2009

(30) Foreign Application Priority Data

Jun. 9, 2008 (GB) .................................. 0810500.9

(51) Int. Cl.
*B64C 3/48* (2006.01)
(52) U.S. Cl. ...................... 244/214; 244/200.1; 244/213; 244/215
(58) Field of Classification Search ............... 244/199.1, 244/200, 200.1, 213, 214, 216
See application file for complete search history.

(56) References Cited

U.S. PATENT DOCUMENTS

| | | | | |
|---|---|---|---|---|
| 5,088,665 A | * | 2/1992 | Vijgen et al. | 244/200 |
| 5,265,830 A | * | 11/1993 | Allen | 244/213 |
| 2003/0226936 A1 | * | 12/2003 | Mau et al. | 244/214 |

FOREIGN PATENT DOCUMENTS

| | | |
|---|---|---|
| EP | 1 527 992 | 5/2005 |
| GB | 1 404 153 | 8/1975 |
| JP | 2008-94177 | 4/2008 |

OTHER PUBLICATIONS

Search Report for GB 0810500.9 dated Sep. 25, 2008.

* cited by examiner

*Primary Examiner* — Tien Dinh
*Assistant Examiner* — Nicholas McFall
(74) *Attorney, Agent, or Firm* — Nixon & Vanderhye P.C.

(57) ABSTRACT

An aircraft wing comprising a leading element and a trailing element moveably coupled together, said elements being positionable relative to each other so that air can flow from the underside of the leading element over the top of the trailing element through a gap between the leading element and the trailing element, wherein a trailing edge of the leading element proximate to the trailing element is configured to disrupt air flow as it flows over said trailing edge and through the gap.

34 Claims, 17 Drawing Sheets

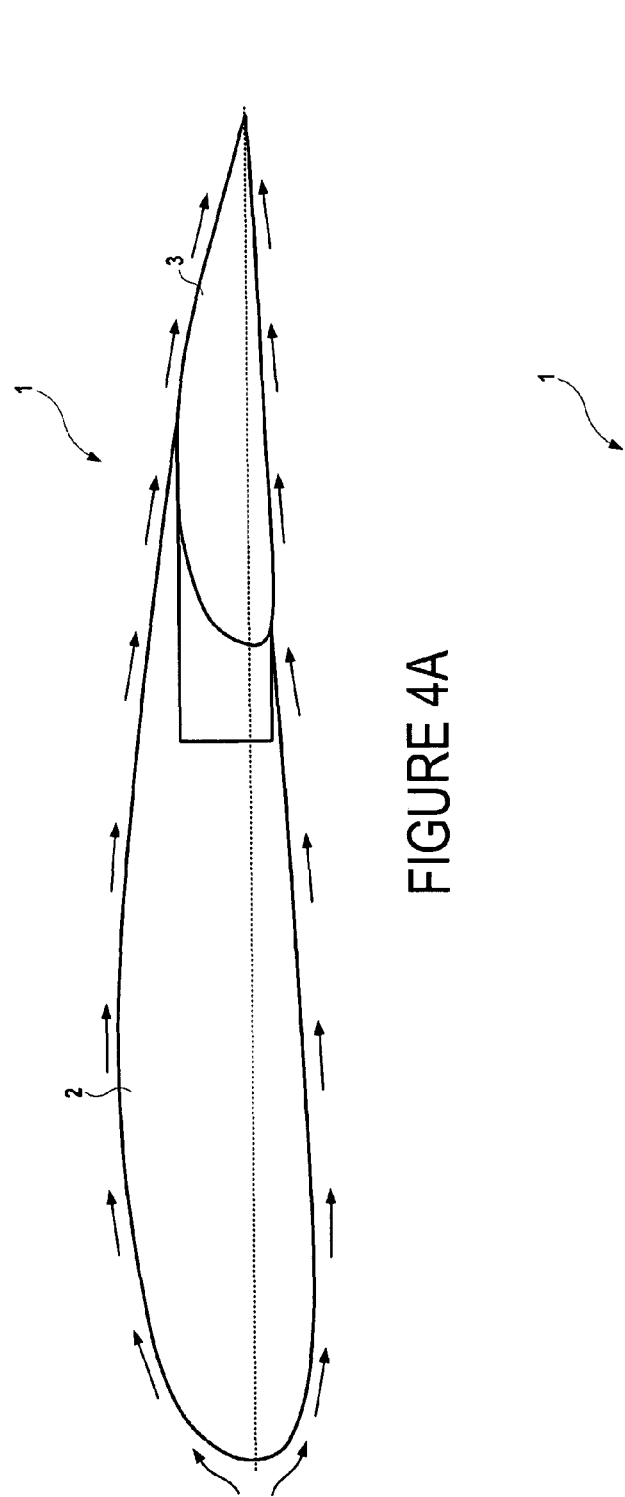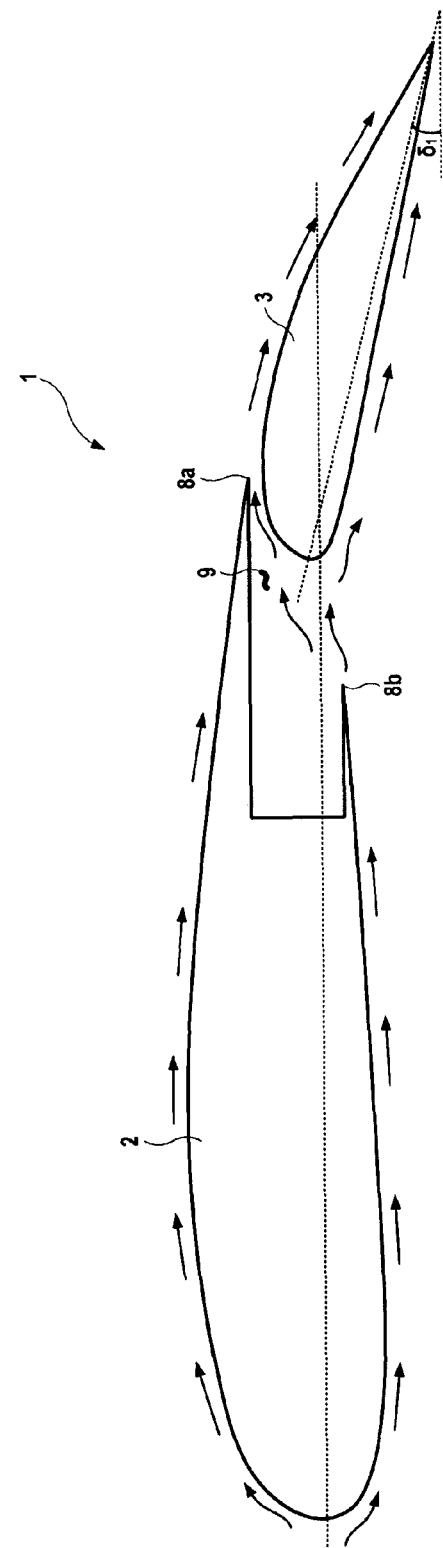
FIGURE 4A
FIGURE 4B

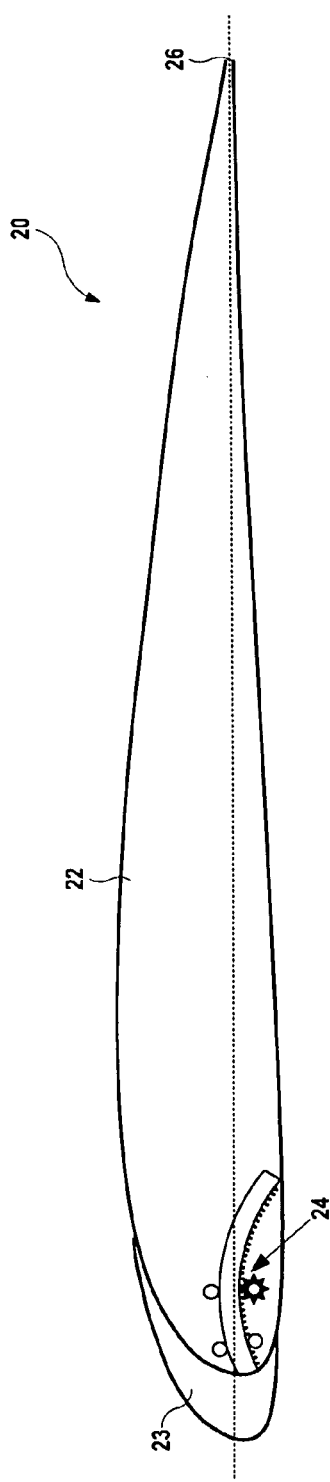
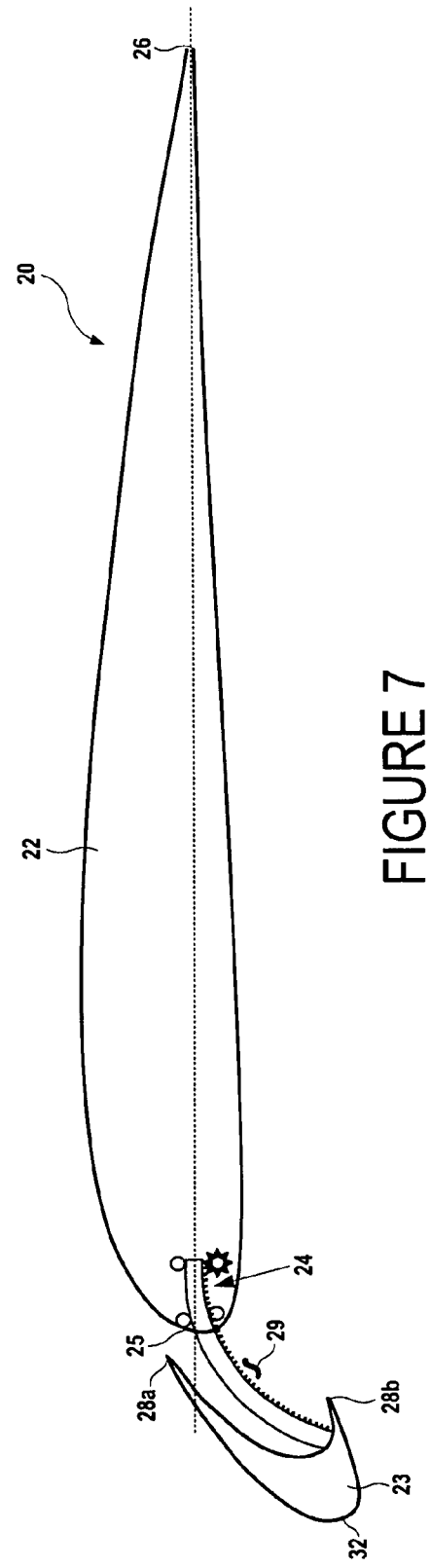

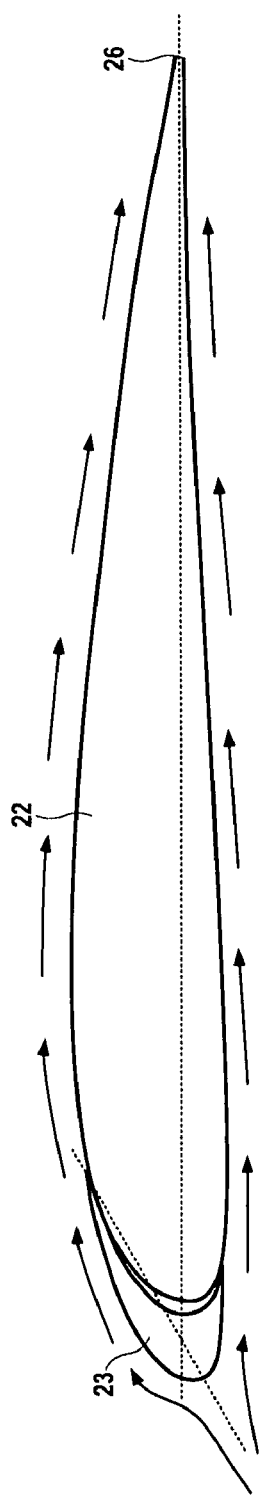
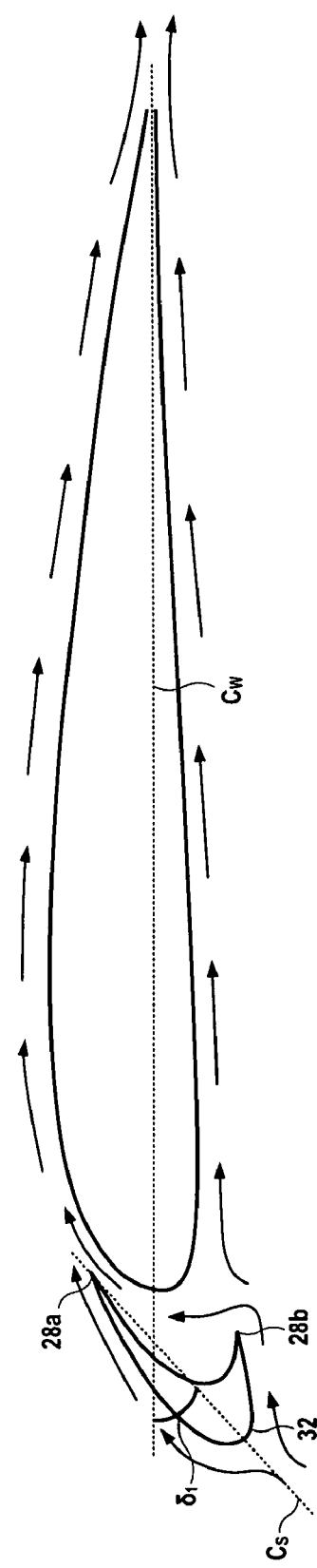
FIGURE 8A
FIGURE 8B

AIRCRAFT WING

This application claims priority to British Patent Application No. 0810500.9 filed 9 Jun. 2008, the entire contents of which is hereby incorporated by reference.

FIELD OF THE INVENTION

The present invention relates to an aircraft wing and, in particular, to an aircraft wing configured to reduce air flow separation over a surface thereof.

BACKGROUND

A conventional type of aircraft wing or 'high-lift section' design is shown in FIGS. 1-4C and comprises a wing element 2 with a moveable 'high-lift device' in the form of a flap 3 attached to a trailing edge thereof. The flap 3 is moveable from a stowed position in which it is positioned in line with and in contact with the wing element 2 to form a single continuous wing/high lift section profile (see FIG. 4A). This configuration is used during cruise flight. The flap 3 can also be moved to a deployed position in which the flap 3 extends away from and downwardly relative to the wing element 2 (see FIG. 4B). This type of high lift section/wing design is known as a 'slotted high lift system' because in the deployed position, the flap 3 is spaced from the wing element 2 and thereby defines an aerodynamic slot 9 therebetween.

In use, when the flap 3 is in the stowed position, air flows over the upper and lower surfaces of the wing element 2 and flap 3 and merges at the trailing edge of the flap 3, as shown in FIG. 4A. However, when the flap 3 is in the deployed position, some of the air flow from the underside of the wing element 2 passes through the slot 9, over the leading edge of the of the flap 3, and along the upper surface of the flap 3, as shown in FIG. 4B. This increases circulation around the wing element 2 and the slot 9 is designed so that that pressure distribution around the flap 3, in particular, the peak pressure at the leading edge, is suppressed to prevent flow separation on the flap upper surface so that the air flow remains attached to the flap 3. When flow separation occurs at the flap 3, the high-lift section 1 experiences a significant loss in lift and so flow separation along the flap 3 is highly undesirable in such wing design.

The slot geometry formed by the two elements has a powerful influence on the flow quality over the high-lift elements. The dimensions used in measurement of slot geometry for any given flap deflection are shown in FIG. 3 and include 'gap' G—the shortest distance measured radially from the tip of the upper trailing edge of the wing element 2 to the flap surface; and 'lap' L—the distance from the front-most leading edge of the flap 3 to the upper trailing edge of the wing element 2 in the chordwise direction. As can be seen from FIGS. 4B and 4C, the flap 3 can be deployed at different angles, and it is important to ensure that the slot shape provides satisfactory aerodynamic performance for all possible flap deployment angles. Often, due to optimising the slot shape for a particular flap deflection, the resulting slot shape for other angles is not satisfactory and can result in high pressure gradients on the leading edge of the flap, resulting in flow separation. Such problematic slot shapes can include too large or too small slots, or where the slot is divergent or so-called 'con-di'—i.e. initially convergent but then including a divergent portion towards the rear (see FIG. 3 for example). In addition, flow separation may occur with high flap deployment/deflection angles due to the pressure gradient on the flap becoming too large for the flow to remain attached along the length of the flap 3, even with the optimum slot shape (see FIG. 4C).

An alternative known type of wing/high-lift section configuration 20 is shown in FIGS. 5-8C. It comprises a wing element 22 but instead of a high lift device in the form of a flap being coupled to the trailing edge of the wing element, as in the embodiment shown in FIGS. 1-4C, it comprises a different type of moveable high-lift device in the form of a 'slat' 23 coupled to the leading edge of the wing element 22. Therefore, in this wing configuration, the 'leading element' is the slat 23 and the 'trailing element' is the wing element 22, whereas in the previous embodiment, the 'leading element' is the wing element 2 and the 'trailing element' is the flap 3.

In this alternative known wing configuration, the slat 23 is moveable to a deployed position (see FIG. 8B) where it is spaced from the wing element 22 to define an aerodynamic slot 29 therebetween. When the slat 23 is in the stowed position, air flows over the upper and lower surfaces of the slat 23 and wing element 22 and merges at the trailing edge of the wing element 22, as shown in FIG. 8A. However, when the slat 23 is in the deployed position, some of the air flow from the underside of the slat 23 passes through the slot 29, over the leading edge of the of the wing element 22, and along the upper surface of the wing element 22, as shown in FIG. 8B. This increases circulation around the slat 23, and the slot 29 is designed so that that pressure distribution around the wing element 22, in particular, the peak pressure at the leading edge, is suppressed to prevent flow separation on the wing upper surface so that the air flow remains attached to the wing element 22. When flow separation occurs at the wing 22 element, it results in a significant loss in lift and so flow separation along the wing element 22 is highly undesirable.

For both known wing/high-lift section configurations 1,20 described above, known measures exist in the prior art to reduce flow separation at the 'trailing element' upper surface (i.e. the upper surface of the flap 3 in the former wing embodiment 1, and the upper surface of the wing element 22 in the latter wing embodiment 20). One such measure is the addition of vortex generators attached to the leading edge of the trailing element which disturb the air flow and create vortices therein. This disturbed air flow in the form of downstream vortices suppresses separation of the air flow as it passes over the upper surface of the trailing element. However, this known prior art solution suffers from a number of drawbacks. Firstly, the discrete elements of the vortex generators must all be attached to a surface of the leading edge of the trailing element as a separate manufacturing step, increasing the cost and complexity of the manufacturing process. In addition, since the vortex generators are attached to the trailing element, they can become loose and fall off or can break off in operation of the aircraft and so require monitoring and replacement where necessary. Furthermore, since the vortex generators comprise elements upstanding from the trailing element upper surface, they take up space in the wing when the flap/slat is in the stowed position and so introduce space constraints in the wing design to accommodate them. Furthermore, since they project from the upper surface of the trailing element, they increase drag on the structure.

The present invention seeks to provide a wing for an aircraft that substantially alleviates or overcomes the problems mentioned above.

SUMMARY OF THE INVENTION

Accordingly, the present invention provides an aircraft wing comprising a leading element and a trailing element moveably coupled together, said elements being positionable relative to each other so that air can flow from the underside of the leading element over the top of the trailing element through a gap between the leading element and the trailing element, wherein a trailing edge of the leading element proximate to the trailing element is configured to disrupt air flow as it flows over said trailing edge and through the gap.

Preferably, said trailing edge is configured to create vortices in air flow as it flows over said trailing edge and through the gap, and said trailing edge is preferably located at an underside of the leading element.

In a preferred embodiment, said leading element comprises a wing element and said trailing element comprises a flap coupled proximate the trailing edge of the wing element.

The wing element preferably comprises an upper trailing edge at the upper side of the wing element and a lower trailing edge on the underside of the wing element, the lower trailing edge being configured to disrupt air flow as it flows over said lower trailing edge and through the gap.

The upper trailing edge may also be configured to disrupt air flow as it flows over said upper trailing edge.

Preferably, a cove is formed between the upper trailing edge and the lower trailing edge.

In a preferred embodiment, the flap is moveable between a stowed position and a deployed position in which the flap is spaced from the wing to define said gap, and the flap is located partially within the cove in the stowed position.

In an alternative preferred embodiment, said trailing element comprises a wing element and said leading element comprises a slat coupled to the leading edge of the wing element.

The slat is preferably moveable between a stowed position in which the slat is disposed adjacent to the wing element, and a deployed position in which the slat is spaced from the wing element to define said gap.

Preferably, the slat comprises an upper trailing edge at the upper side thereof and a lower trailing edge on the underside thereof, the lower trailing edge being configured to disrupt air flow as it flows over said lower trailing edge and through the gap.

The upper trailing edge may also be configured to disrupt air flow as it flows over said upper trailing edge.

In another preferred embodiment, the aircraft wing comprising the wing element and the flap moveable coupled thereto, may further comprise a slat moveably coupled to the leading edge of the wing element.

In such an alternative embodiment, the slat may be moveable between a stowed position in which the slat is disposed adjacent to the wing element, and a deployed position in which the slat is spaced from the wing element to define a gap between the slat and the wing element.

The slat may comprise an upper trailing edge at the upper side thereof and a lower trailing edge on the underside thereof, the lower trailing edge of the slat being configured to disrupt air flow as it flows over said lower trailing edge of the slat and through the gap between the slat and the wing element. Furthermore, the upper trailing edge of the slat may also be also configured to disrupt air flow as it flows over said upper trailing edge of the slat.

The or each trailing edge preferably comprises serrations, and the serrations may extend at least partially along said trailing edge(s) in a span-wise direction, or the serrations may extend entirely along said trailing edge(s) in a span-wise direction.

The serrations may comprise a triangular saw-tooth configuration or may comprise a notched configuration.

The serrations may be formed substantially in the plane of the or each trailing edge surface.

An imaginary chordline may extend between the leading edge and the trailing edge of the leading element, and the serrations in the or each trailing edge may be formed in a substantially chordwise direction.

The present invention also provides a method of suppressing air flow separation over an aircraft wing comprising a leading element and a trailing element moveably coupled together, said elements being positionable relative to each other so that air can flow from the underside of the leading element over the top of the trailing element through a gap between the leading element and the trailing element, the method comprising disrupting air flow as it flows over said trailing edge and through the gap.

Preferably, the step of disrupting air flow comprises creating vortices in air flow as it flows over said trailing edge and through the gap.

Said trailing edge is preferably located at an underside of the leading element, and the method preferably comprises disrupting air flow as it flows over the lower trailing edge and through the gap.

BRIEF DESCRIPTION OF THE DRAWINGS

Preferred embodiments of the present invention will now be described, by way of example only, with reference to FIGS. 9-16 of the accompanying drawings, in which:

FIG. 4A shows the wing of FIGS. 1-3 with the flap in the stowed position with air flow over the wing shown by arrows;

FIG. 4B shows the wing of FIGS. 1-3 with the flap in a deployed position to angle $\delta_1$ from the horizontal and with air flow over the wing shown by arrows;

FIG. 6 shows a schematic cross-section of the wing of FIG. 5 with the slat in a stowed position;

FIG. 7 shows a schematic cross-section of the wing of FIG. 5 with the slat in a deployed position;

FIG. 8A shows the wing of FIGS. 5-7 with the slat in the stowed position with air flow over the wing shown by arrows;

FIG. 8B shows the wing of FIGS. 5-7 with the slat in a deployed position to angle $\delta_1$ from the horizontal and with air flow over the wing shown by arrows;

DETAILED DESCRIPTION

Figure 1:
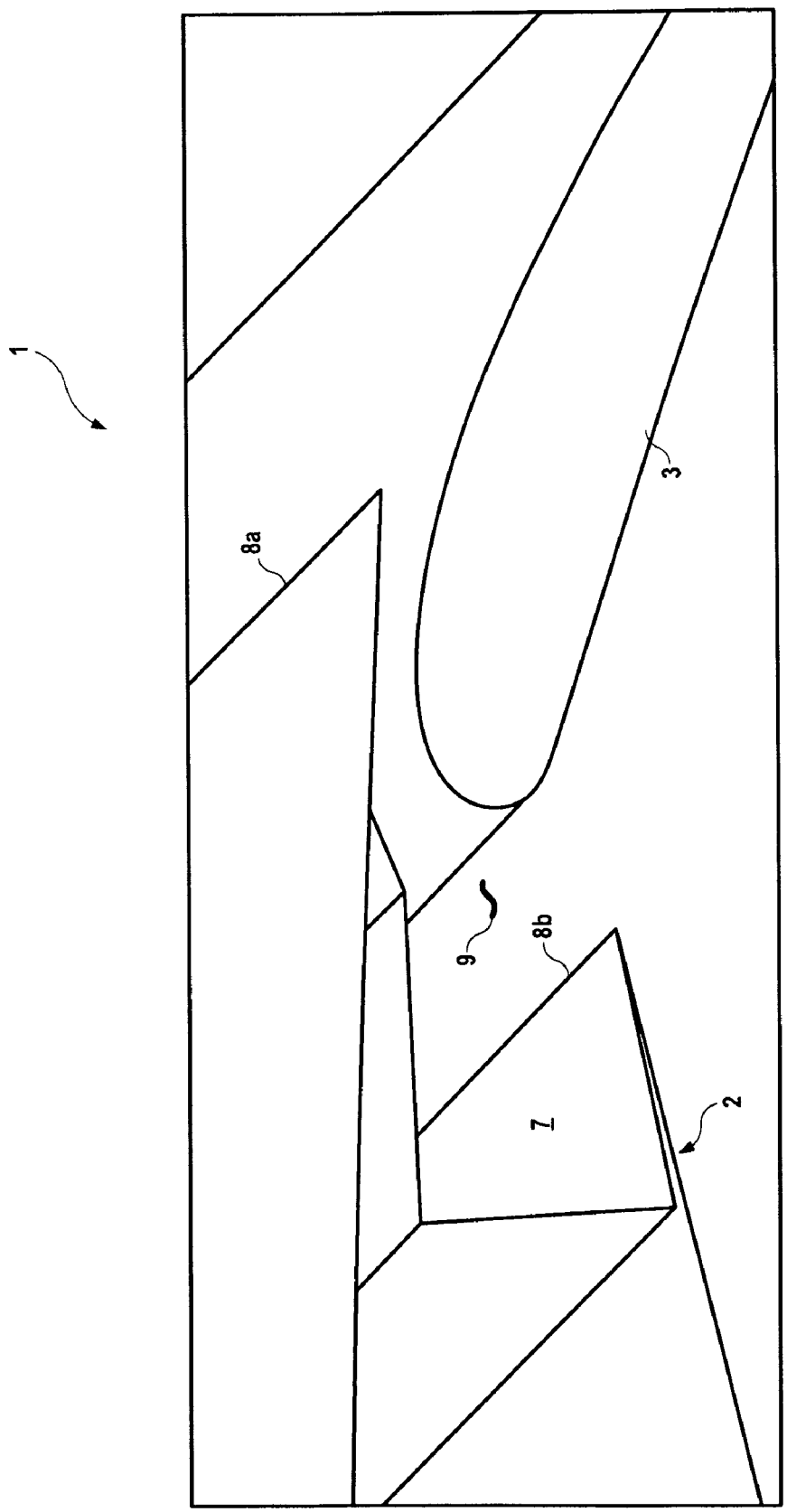
FIG. 1 shows a perspective view of a first conventional wing with a flap in a deployed position.
Figure 2:
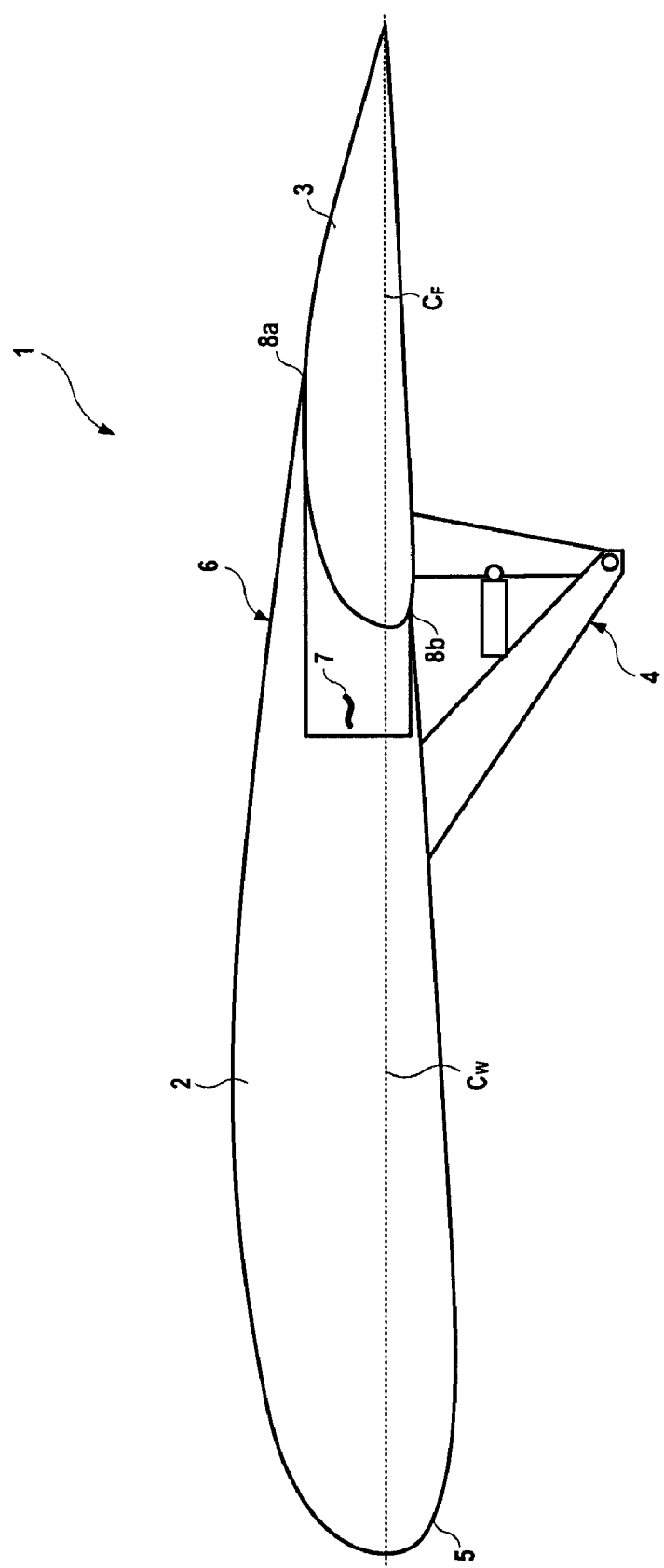
FIG. 2 shows a schematic cross-section of the wing of FIG. 1 with the flap in a stowed position.
Figure 3:
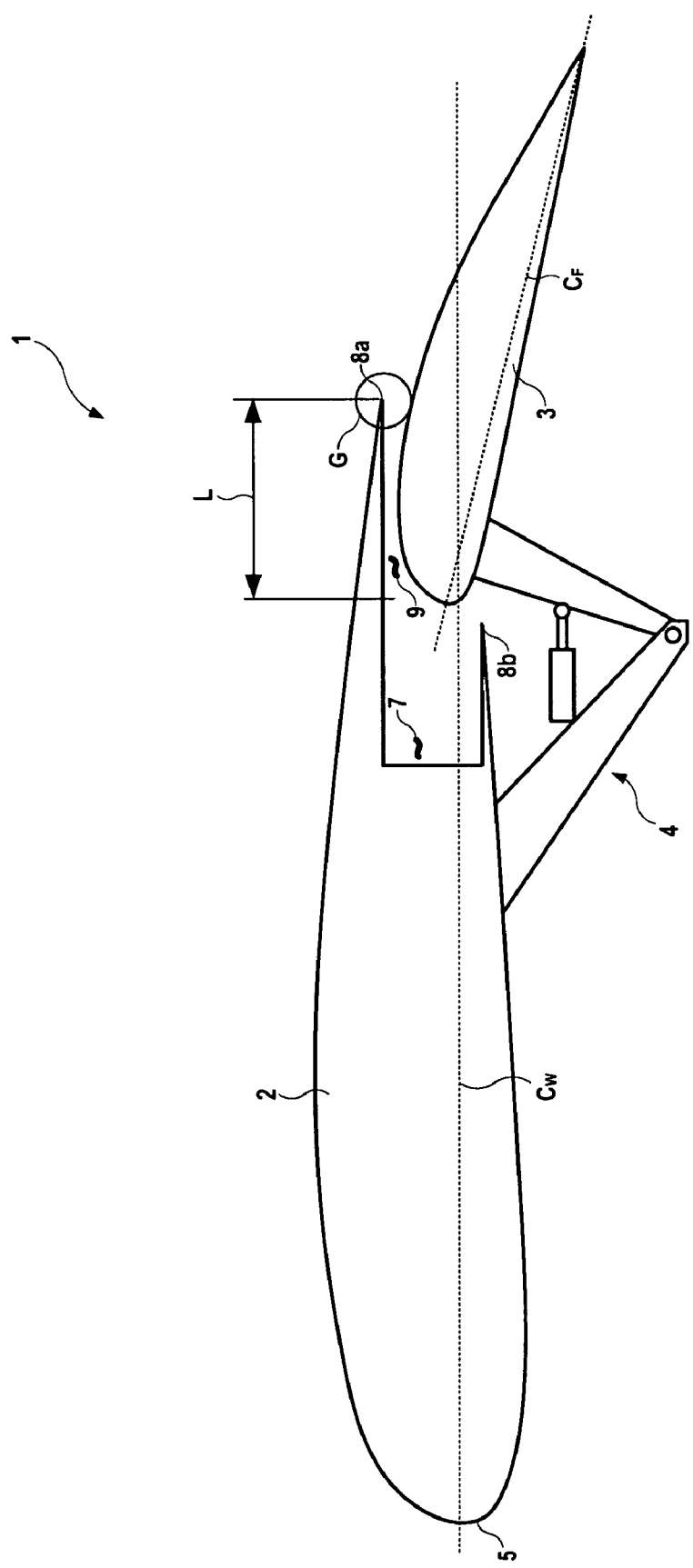
FIG. 3 shows a schematic cross-section of the wing of FIG. 1 with the flap in a deployed position.

Referring to FIGS. 1-4C, a first conventional slotted wing or 'high lift section' 1 is shown comprising a leading element, in the form of a wing element 2, and a trailing element, in the form of a flap 3, moveably coupled to the wing element 2 by a coupling mechanism 4. The wing element 2 includes a leading edge 5. A recess or 'cove' 7 is formed at a rear edge 6 of the wing element 2 opposite the leading edge 5, to partially accommodate the flap 3 when in the stowed position (see FIG. 4A) and the rear edge 6 includes an upper trailing edge 8a and a lower trailing edge 8b disposed above and below the cove 7 respectively. An imaginary line or 'chordline' extends from the leading edge 5 of the wing element 2 to the rear edge 6 along a plane of the wing element 2. This chordline is designated as dotted line '$C_w$'. Similarly, a corresponding chordline '$C_F$' is shown as a dotted line extending from the leading edge of the flap 3 to its trailing edge. FIG. 4A shows that when the flap 3 is in the stowed position, the flap 3 is located partially within the cove 7 with the upper trailing edge 8a lying flush against the upper surface of the flap 3 and the lower trailing edge 8b lying flush against the lower surface of the flap 3, with the chordline $C_F$ of the flap 3 aligned with the chordline $C_w$ of the wing element 2.

FIG. 4A shows that when the flap 3 is in the stowed position, air flow over the wing element 2 passes across the upper and lower surfaces of the wing element 2 and flap 3 and then merges as it reaches the trailing edge of the flap 3.

FIG. 4B shows the wing element 2 with the flap 3 in a first deployed position in which the flap 3 is disposed at an angle of $\delta_1$ from the horizontal. In this deployed position, the flap 3 is spaced from the wing element 2 to define a slot 9 therebetween. FIG. 4B shows that air flows from the underside of the wing element 2, over the lower trailing edge 8b, through the slot 9 to the upper surface of the flap 3 and across the upper surface of the flap 3. With the flap at angle $\delta_1$ from the horizontal, the pressure distribution and gradient around the leading edge of the flap 3 is sufficient such that the air flow remains attached to the upper surface of the flap 3 as it flows over the length of the flap 3 to the flap's trailing edge.

Figure 4C:
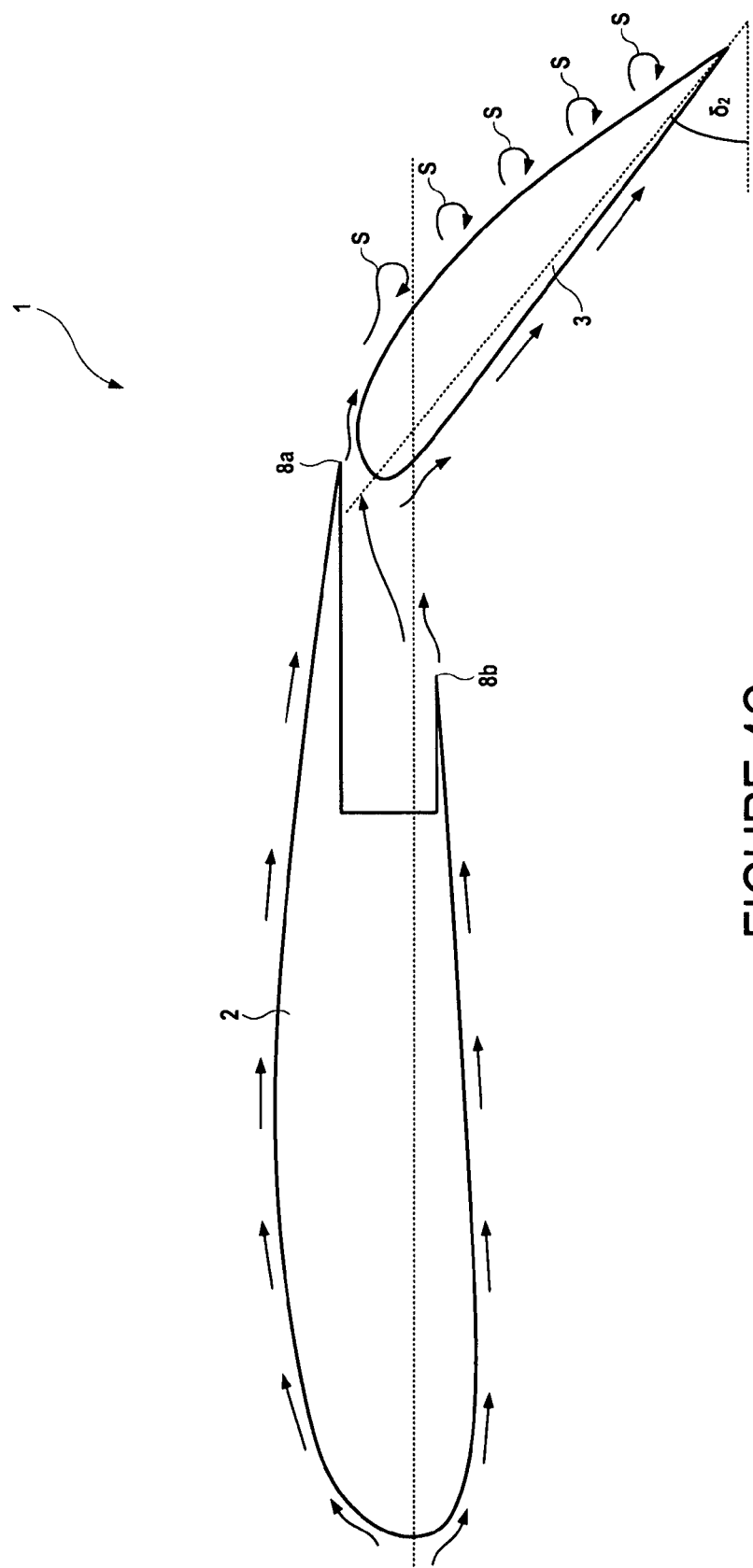
FIG. 4C shows the wing of FIGS. 1-3 with the flap in a deployed position to angle $\delta_2$ (greater than $\delta_1$) from the horizontal and with air flow over the wing shown by arrows.
Figure 5:
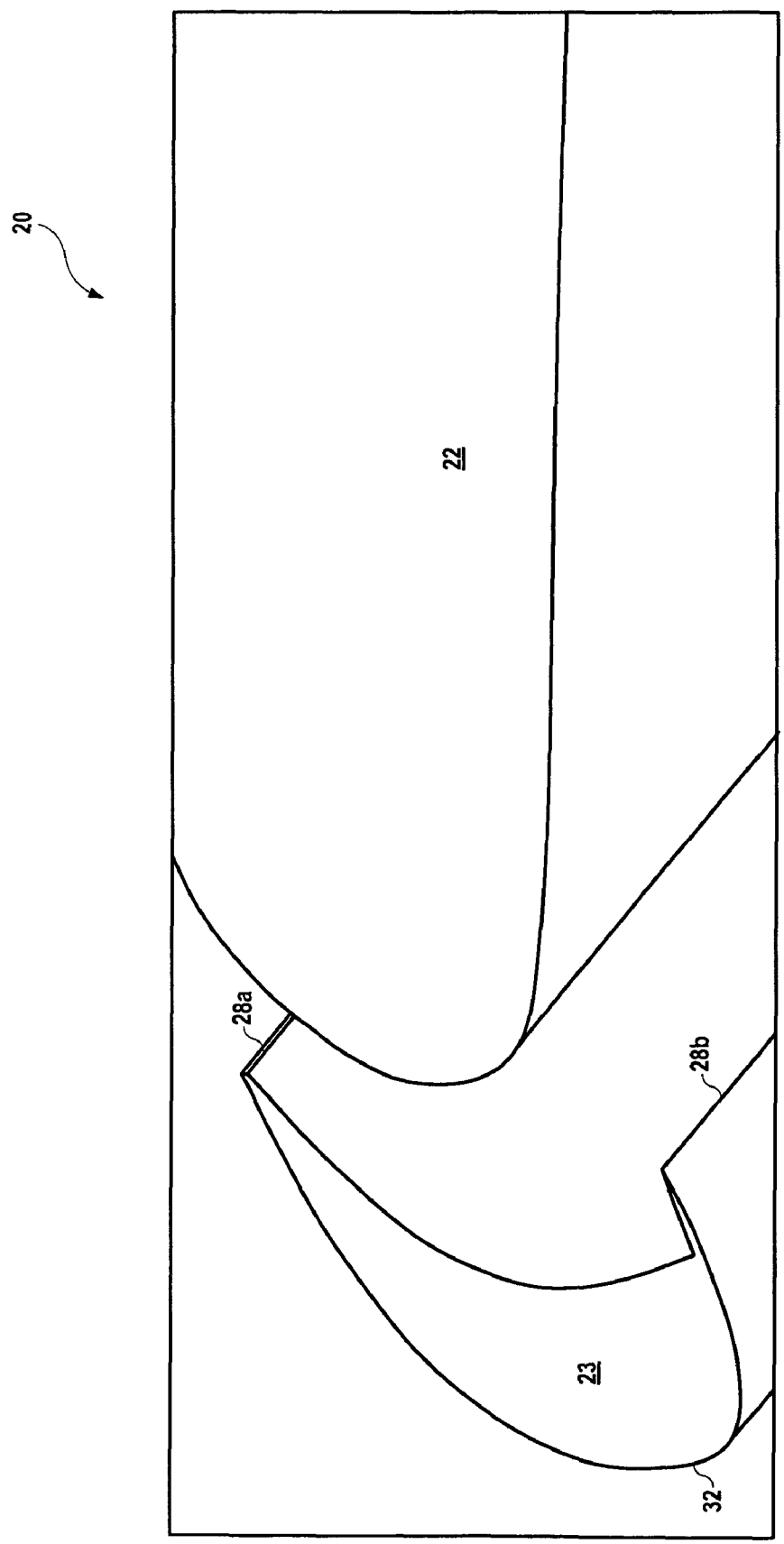
FIG. 5 shows a perspective view of a second known conventional wing with a leading edge slat in a deployed position.

Referring now to FIG. 4C, the flap 3 is shown in a second deployed position in which the flap 3 is disposed at an angle of $\delta_2$ from the horizontal, greater than angle $\delta_1$. At this second position, the high angle $\delta_2$ of the flap 3 creates a strong pressure gradient at the leading edge of the flap 3 resulting in flow separation shortly after the leading edge of the flap 3, shown by arrows S in FIG. 4C. This flow separation causes a significant loss in lift, thereby significantly reducing the effectiveness of the high lift section 1.

A second conventional wing or 'high lift section' 20 is shown in FIGS. 5-8C, comprising a trailing element, in the form of a wing element 22, and a leading element, in the form of a slat 23, moveably coupled to the wing element 22 by a coupling mechanism 24. The slat 23 is thereby moveable between a stowed position (see FIGS. 6 and 8A) in which it is retracted and lies flush against a leading edge 25 of the wing element 22, and a deployed position (see FIGS. 5, 7, 8B and 8C) in which it is spaced from the leading edge 25 of the wing element 22 to define a gap 29 therebetween. The slat 23 includes a leading edge 32 and a rear edge 33, and the rear edge 33 includes an upper trailing edge 28a and a lower trailing edge 28b.

FIG. 8A shows that when the slat 23 is in the stowed position, air flow over the wing element 22 passes across the upper and lower surfaces of the slat 23 and wing element 22 and then merges as it reaches a trailing edge 26 of the wing element 22.

FIG. 8B shows the wing element 22 with the slat 23 in a first deployed position in which the slat 23 is disposed at an angle of $\delta_1$ from the horizontal, measured with respect to a chordline $C_s$ extending between the leading edge 32 of the slat 23 and to its upper trailing edge 28a. In this deployed position, the slat 23 is spaced from the wing element 22 to define a slot 29 therebetween. FIG. 8B shows that air flows from the underside of the slat 23, over the lower trailing edge 28b, through the slot 29 to the upper surface of the wing element 22 and across the upper surface of the wing element 22. With the slat at angle $\delta_1$ from the horizontal, the pressure distribution and gradient around the leading edge 25 of the wing element 22 is sufficient such that the air flow remains attached to the upper surface of the wing element 22 as it flows over the length of the wing element 22 to the wing element's trailing edge 26.

Figure 8C:
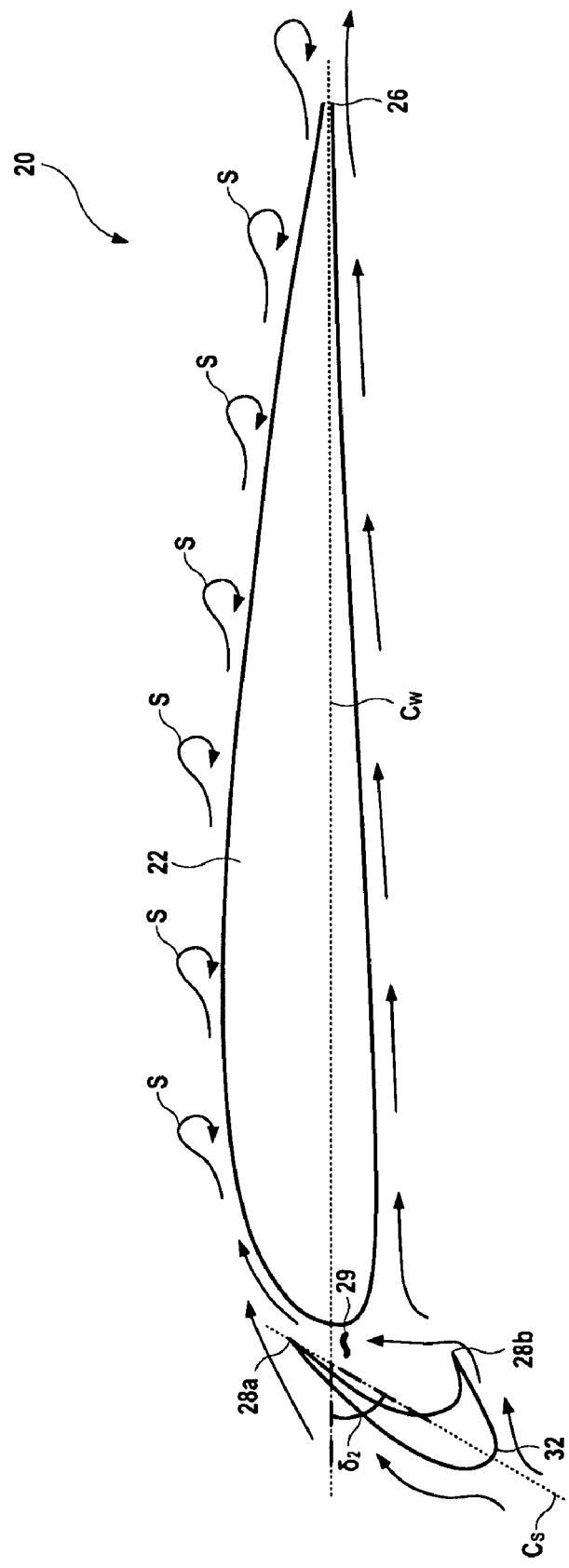
FIG. 8C shows the wing of FIGS. 5-7 with the slat in a deployed position to angle $\delta_2$ (greater than $\delta_1$) from the horizontal and with air flow over the wing shown by arrows

Referring now to FIG. 8C, the slat 23 is shown in a second deployed position in which the slat 23 is disposed at an angle of $\delta_2$ from the horizontal, greater than angle $\delta_1$. At this second position, the high angle $\delta_2$ of the slat 23 creates a strong pressure gradient at the leading edge 25 of the wing element 22 resulting in flow separation shortly after the leading edge 25 of the wing element 22, shown by arrows S in FIG. 8C. This flow separation causes a significant loss in lift, thereby significantly reducing the effectiveness of the high lift section 20.

It will be appreciated that in each of the two conventional wing/high lift sections 1,20 shown and described above, the flow separation at the trailing element (i.e. at the flap 3 in the first conventional high left section 1, and at the wing element 22 in the second conventional high lift section 20) is highly undesirable as it causes significant loss in lift. However, all known means to try to prevent flow separation from the trailing element necessitate the use of separate discrete vortex generators located on the trailing element 3,23 and therefore suffer the various drawbacks described above.

Figure 9:
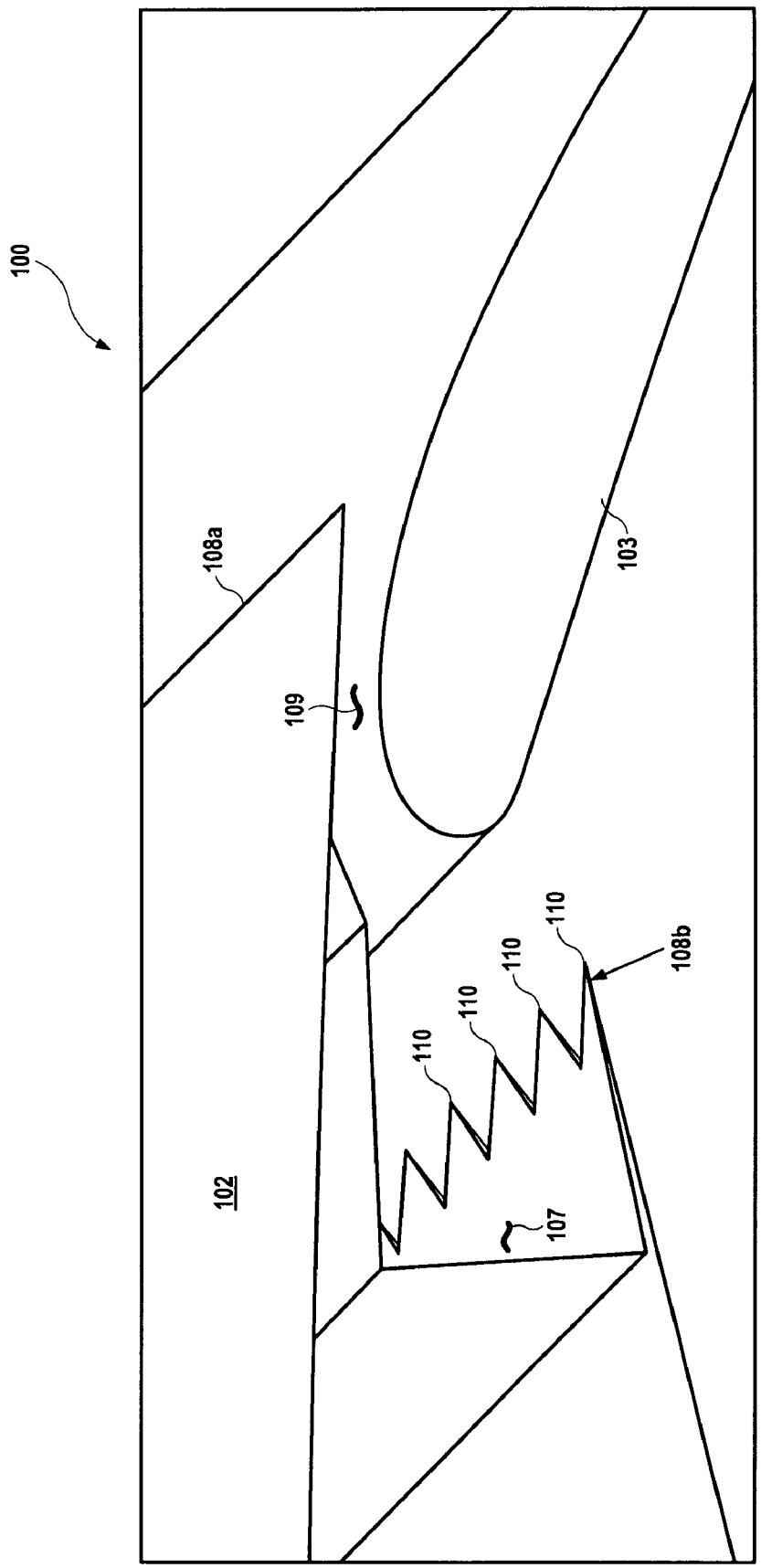
FIG. 9 shows a perspective view of a wing according to a first embodiment of the present invention with the flap in a deployed position.
Figure 10:
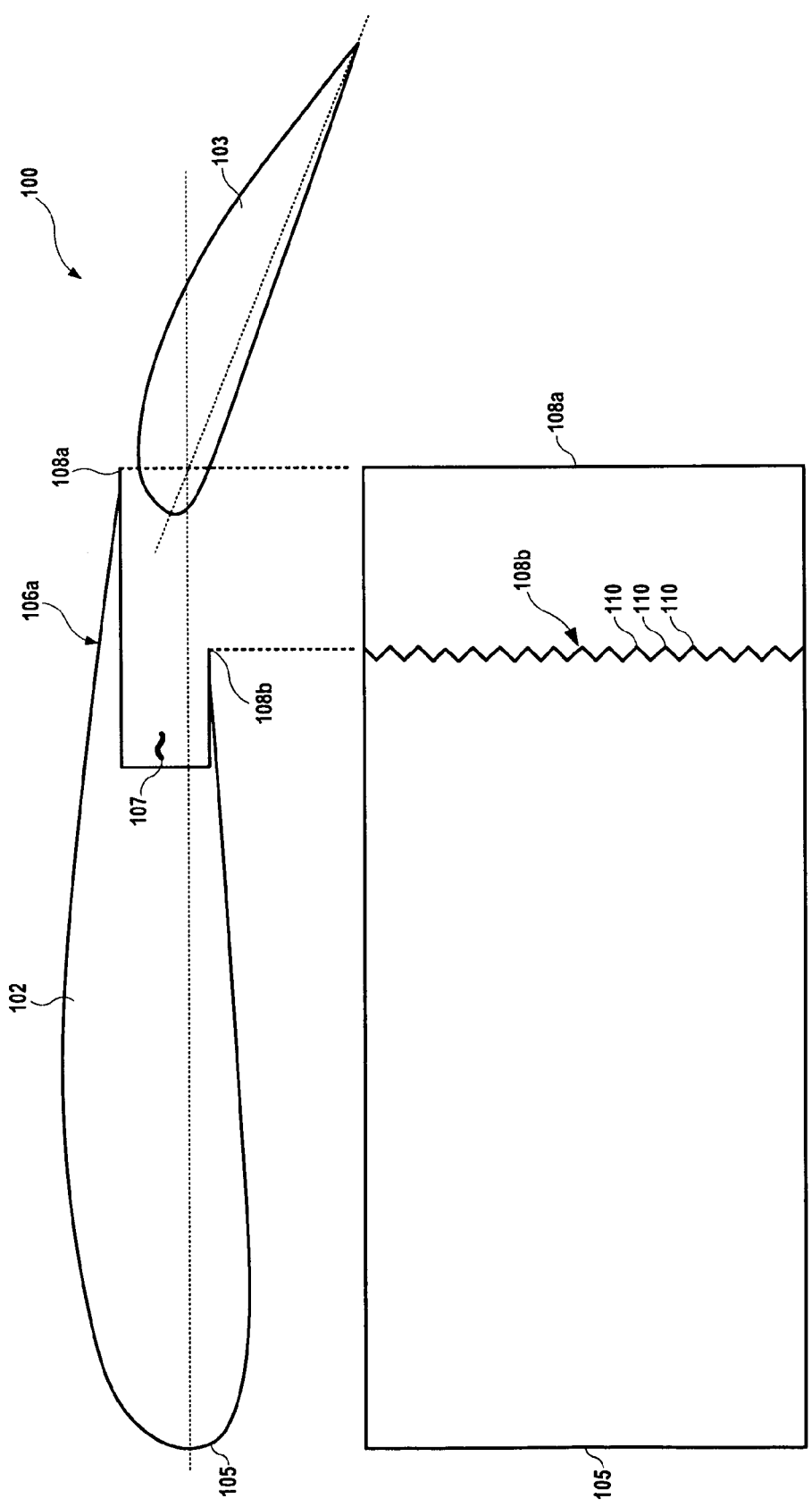
FIG. 10 shows a schematic side view and plan view from below of the wing of FIG. 9, with the flap omitted for clarity in the plan view from below.
Figure 11:
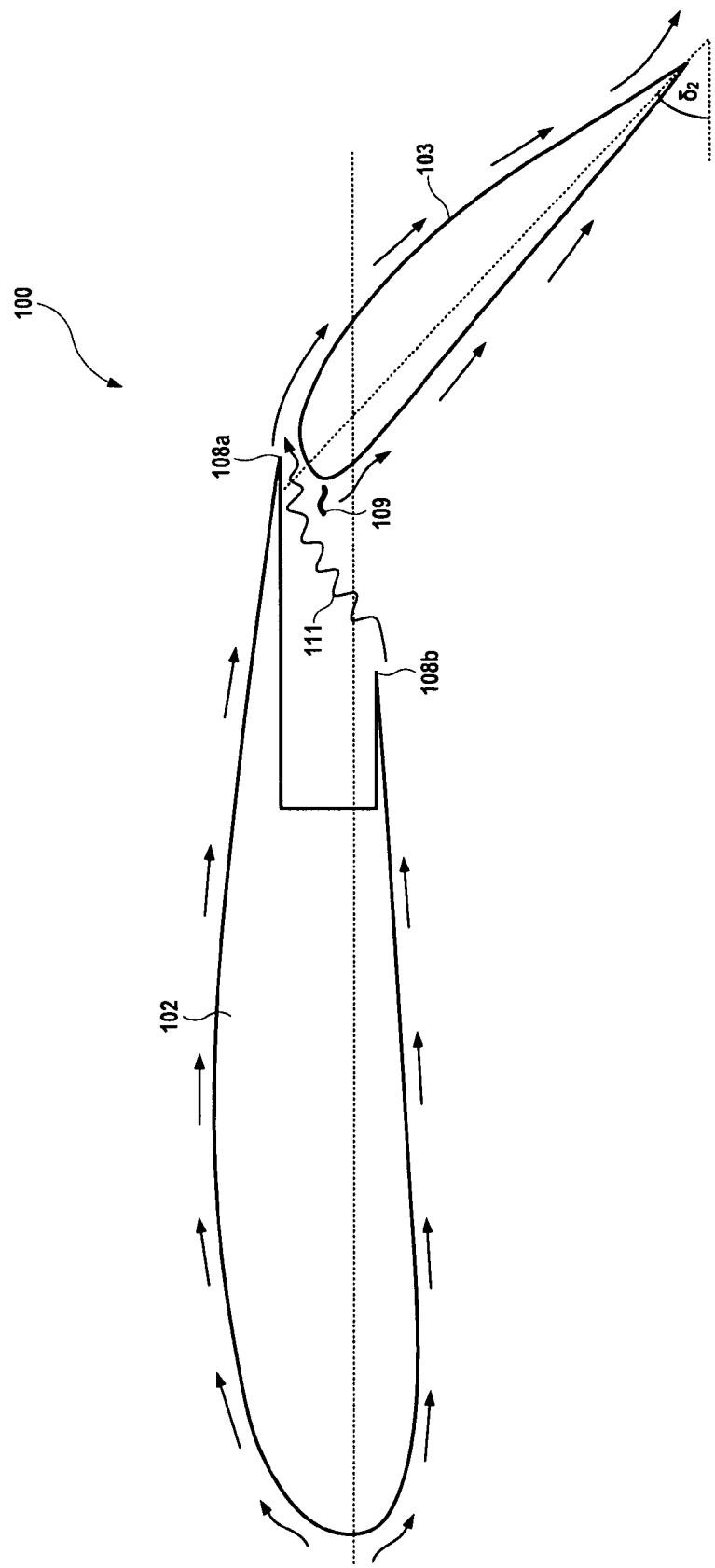
FIG. 11 shows the wing of FIGS. 9 and 10 with the flap in a deployed position to angle $\delta_2$ from the horizontal and with air flow over the wing shown by arrows.

In order to overcome the problem of, flow separation from the surface of the trailing element, without suffering the known problems of prior art solutions, a first embodiment of a high-lift section 100 of the present invention is provided as shown in FIGS. 9-11. This first embodiment of the present invention 100 corresponds to the first known high-lift section 1 described above. The wing/high-lift section 100 of the present invention comprises a wing element 102 and a flap 103 coupled to the wing element 102 by a coupling mechanism (not shown). The wing element 102 includes a leading edge 105, and a recess or 'cove' 107 is formed at a rear edge 106 of the wing element 102 opposite the leading edge 105, to partially accommodate the flap 103 when in the stowed position. The rear edge 106 includes an upper trailing edge 108a and a lower trailing edge 108b disposed above and below the cove 107 respectively. When the flap 103 is in the stowed position, the flap 103 is partially located within the cove 107, with the upper trailing edge 108a lying flush against the upper surface of the flap 103 and the lower trailing edge 108b lying flush against the lower surface of the flap 103. Also, when the flap is in a deployed position as shown in FIGS. 9-11, the flap 103 is spaced from the wing element 102 to define a slot 109 therebetween.

The lower trailing edge 108b is not straight-edged as in the known wing 1 described above and shown in FIGS. 1-4C, but instead is formed in a saw-tooth or chevroned edge pattern, comprising a plurality of triangular serrations 110 extending rearwardly from the lower trailing edge 108b in the same plane as the lower trailing edge 108b. In use, the air flow flows over the lower surface of the wing element 102, and it passes over the chevroned lower trailing edge 108b before passing through the slot 109 and subsequently arriving at the leading edge of the flap 103. The chevroned pattern of the lower trailing edge 108b acts as a vortex generator to disrupt the air flow passing over it and introduces vortices 111 into the air flow. These vortices 111 remain entrained in the air flow as it passes over the flap 103, as shown by the air flow arrows in FIG. 11, and suppress flow separation from the upper surface of the flap 103 when the flap 103 is deployed to a high angle position from the horizontal, such an angle of $\delta_2$ shown in FIG. 11.

The first embodiment of the invention shown in FIGS. 9-11 comprises a chevroned or serrated lower trailing edge 108b, whilst the upper trailing edge 108a is straight-edged as with conventional slotted wing/high lift section designs. The advantage of this arrangement is that with a straight edged upper trailing edge, there is little high-speed drag compared to that caused by the serrations on the lower trailing edge. The level of drag on an upper surface of a wing is a more critical in high speed air flows than that on the lower surface of the wing. Therefore, the minimisation of drag on the upper surface is achieved with the straight edged upper trailing edge, and the increased drag on the underside surface is less critical and so is more acceptable.

Figure 12:
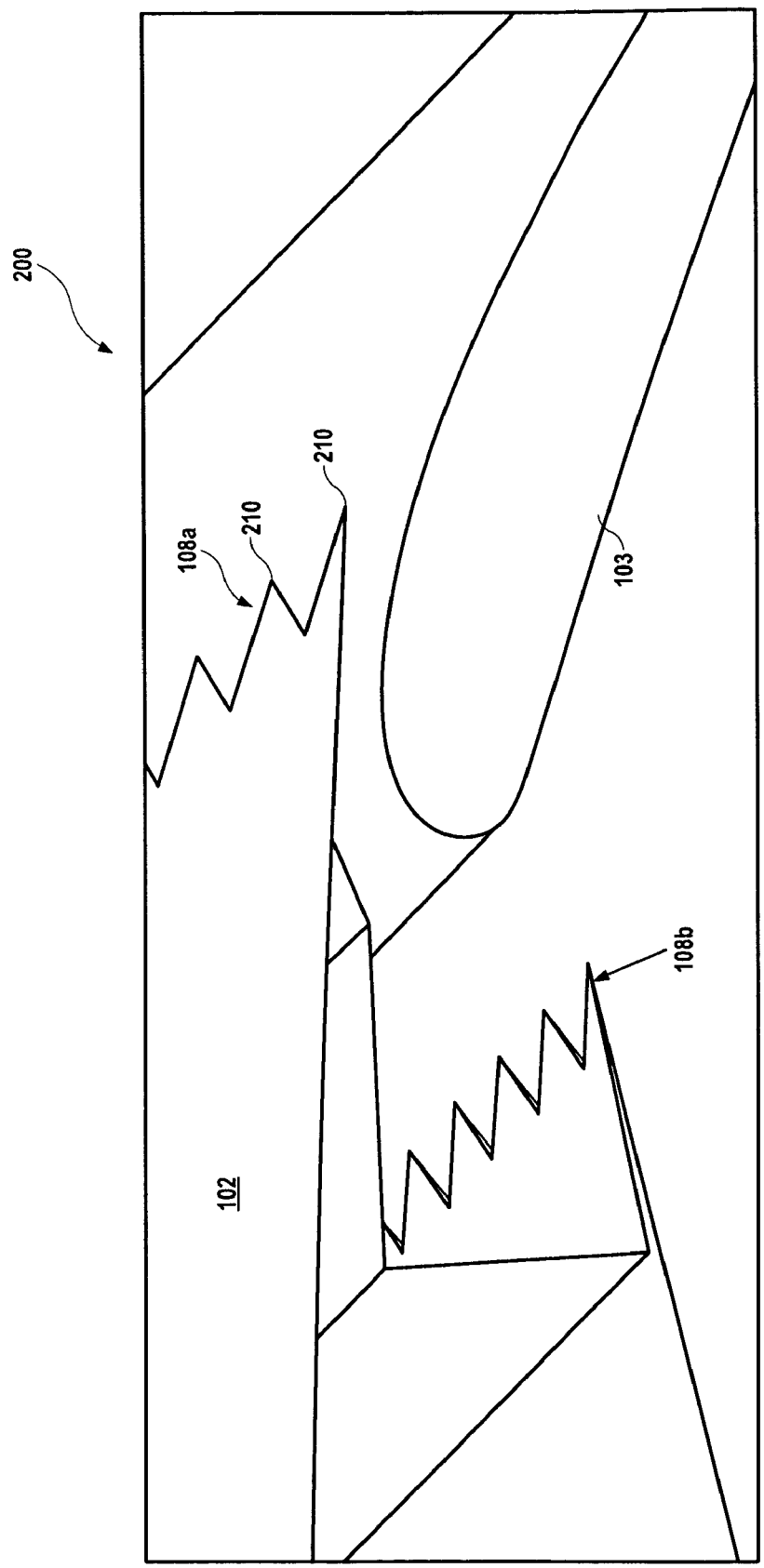
FIG. 12 shows a perspective view of a wing according to a second embodiment of the present invention with the flap in a deployed position.
Figure 13:
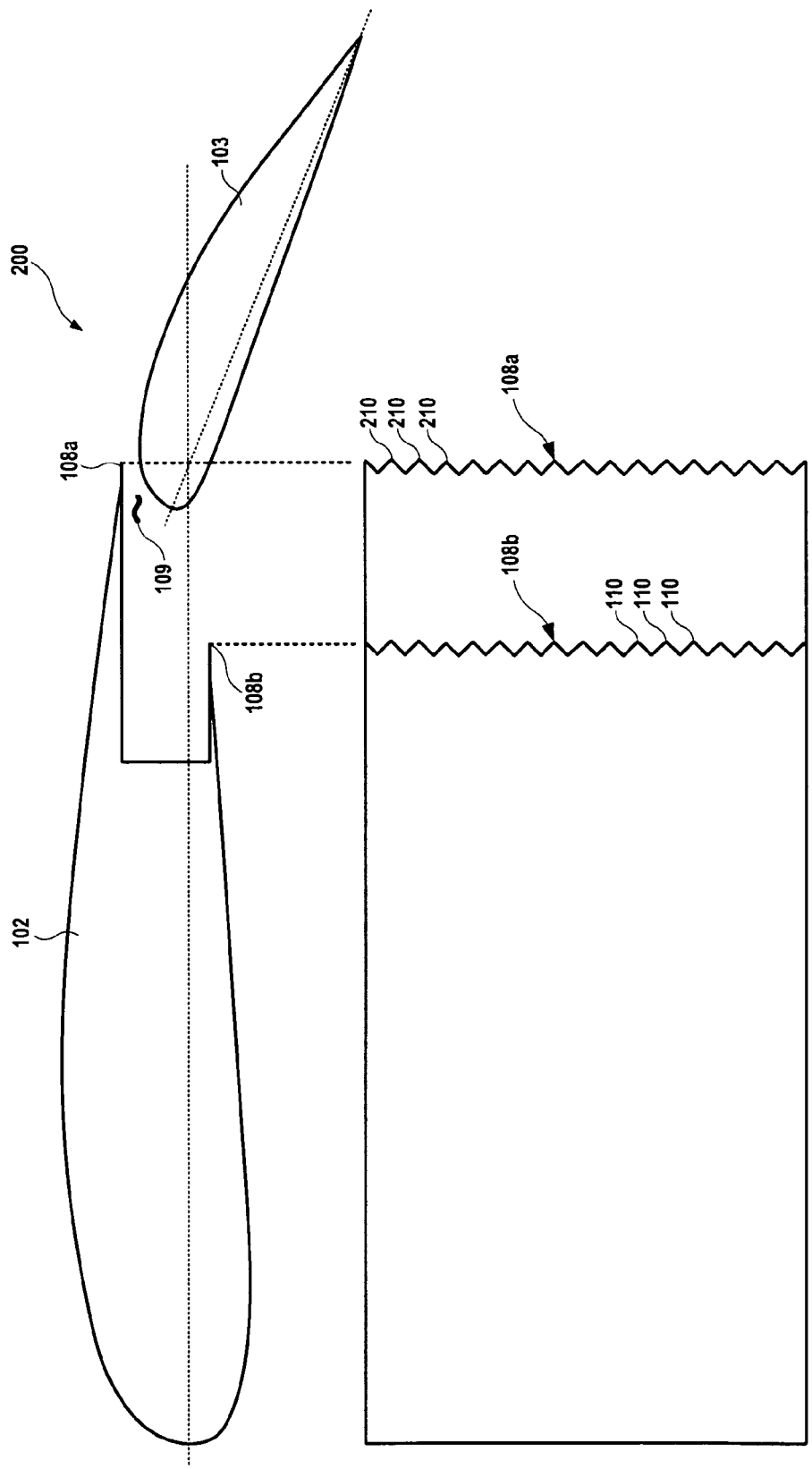
FIG. 13 shows a schematic side view and plan view from below of the wing of FIG. 12, with the flap omitted for clarity in the plan view from below.

Notwithstanding the above, it is intended within the scope of the invention that the upper trailing edge 108a may also be configured so as to disrupt air flow as it passes thereover. This alternative second embodiment of the invention 200 is shown in FIGS. 12 and 13 (where corresponding features to the first embodiment of the invention retain like reference numerals, description of which will not be repeated) which shows that that the upper trailing edge 108a is also formed in a serrated or chevroned pattern. Therefore, in addition to the air flow from the lower surface of the wing element 102 being disrupted as described above, the air flow over the upper surface of the wing element 102 encounters the upper trailing edge 108a before arriving at the leading edge of the flap 103 and so is disrupted by the serrations at the upper trailing edge 108a. This causes further vortices 111 to be generated in the air flow ahead of the leading edge of the flap 103 which also remain entrained in the air flow as it passes over the flap 103. This second embodiment 200 has the added benefit that it improves the mixing of the different velocity air flows from the upper surface of the wing element 102 and the lower surface of the wing element 102 having passed through the slot 109. The meeting of these different velocity air flows is a significant source of noise from high lift sections, so more effective mixing of the different speed air flows is beneficial for noise reduction.

Figure 14:
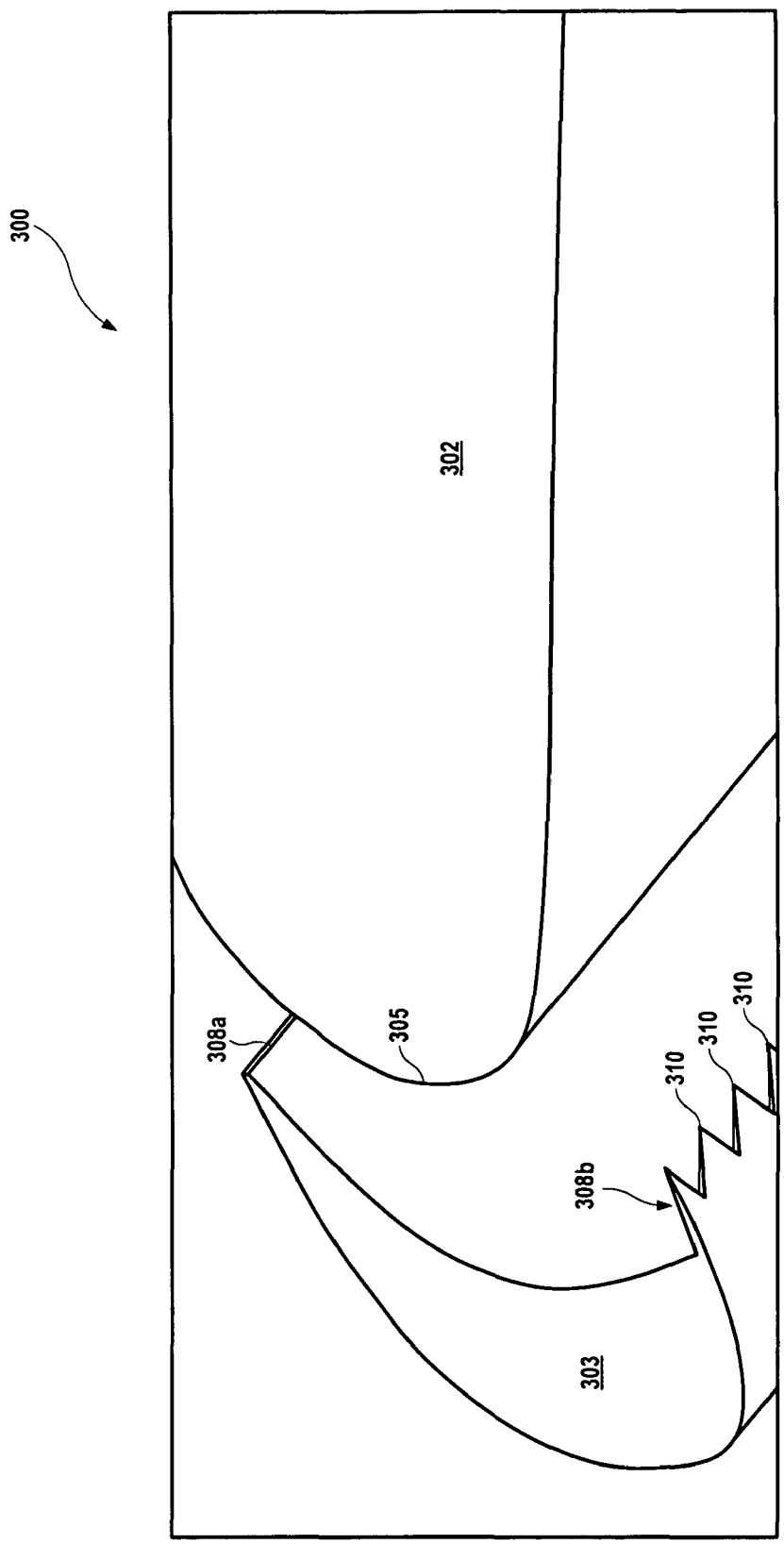
FIG. 14 shows a perspective view of a wing according to a third embodiment of the present invention with the slat in a deployed position.
Figure 15:
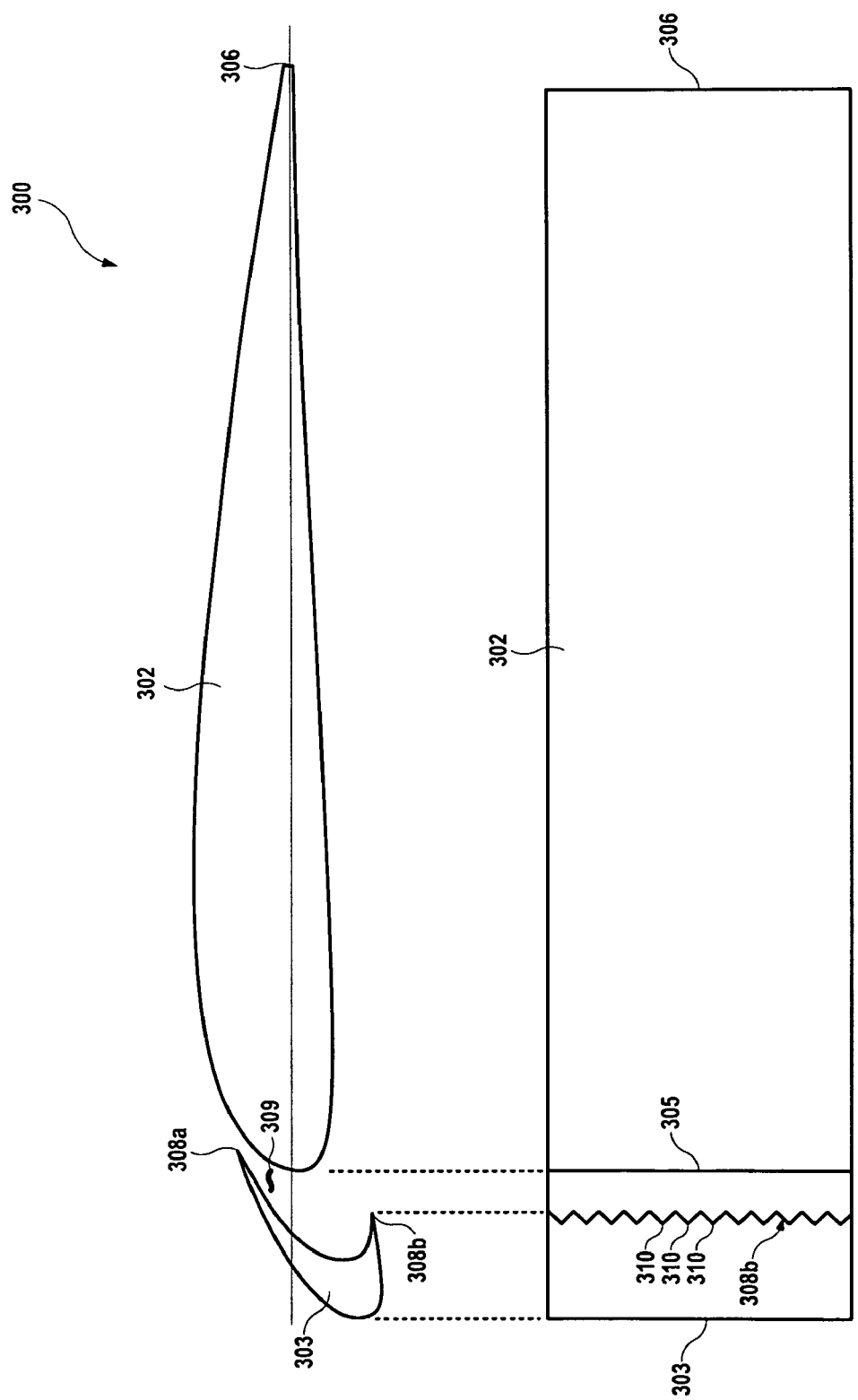
FIG. 15 shows a schematic side view and plan view from below of the wing of FIG. 14.
Figure 16:
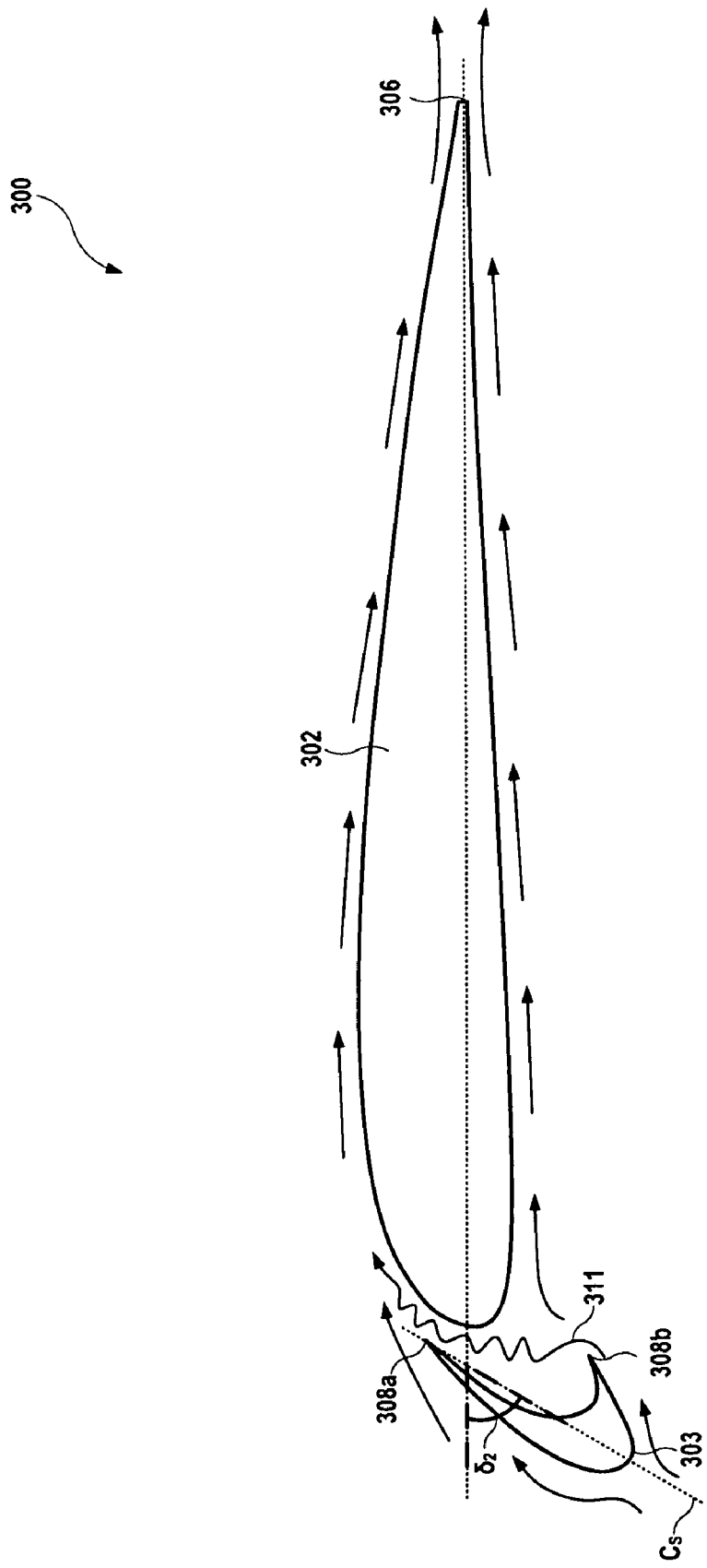
FIG. 16 shows the wing of FIGS. 14 and 15 with the slat in a deployed position to angle $\delta_2$ from the horizontal and with air flow over the wing shown by arrows.

A third embodiment of the present invention is shown in FIGS. 14-16. This third embodiment of the present invention 300 corresponds to the second known high-lift section 20 described above. The wing/high-lift section 300 of the present invention comprises a wing element 302 and a slat 303 coupled to the wing element 302 by a coupling mechanism (not shown). The wing element 302 includes a leading edge 305 and a trailing edge 306 opposite the leading edge 305. The slat 303 is coupled to the leading edge 305 of the wing element 302 to be moveable between a stowed position in which it is positioned adjacent to the leading edge 305 of the wing element 302, and a deployed position (see FIGS. 15 and 16) in which it is spaced from the leading edge 305 of the wing element 302 to define a gap 309 therebetween. The slat 303 includes an upper trailing edge 308a and a lower trailing edge 308b. When the slat 303 is in the stowed position, the slat 303 is positioned such that the upper trailing edge 308a lies flush against the upper surface of the wing element 302 and the lower trailing edge 308b lies flush against the lower surface of the wing element 302.

The lower trailing edge 308b of the slat 303 is not straight-edged as in the known wing/high lift section 20 described above and shown in FIGS. 5-8C, but instead is formed in a saw-tooth or chevroned edge pattern, comprising a plurality of triangular serrations 310 extending rearwardly from the lower trailing edge 308b in the same plane as the lower trailing edge 308b. In use, the air flow flows over the lower surface of the slat 303 and it passes over the chevroned lower trailing edge 308b before passing through the slot 309 and subsequently arriving at the leading edge 305 of the wing element 302. The chevroned pattern of the lower trailing edge 308b acts as a vortex generator to disrupt the air flow passing over it and introduces vortices 311 into the air flow. These vortices 311 remain entrained in the air flow as it passes over the wing element 302, as shown by the air flow arrows in FIG. 16, and suppress flow separation from the upper surface of the wing element 302 when the slat 303 is deployed to a high angle position, such an angle of $\delta_2$ shown in FIG. 16.

Although the above-described embodiment only includes vortex-generating serrations on its lower trailing edge 308b, it is intended within the scope of the invention that vortex-generating serrations could also be provided on the upper trailing edge 308a. In such an un-illustrated embodiment, the advantages described above with respect to the second embodiment of the invention shown in FIGS. 12 and 13 would similarly apply. From the above, it will be appreciated that the present invention overcomes the problem of flow separation on high-lift sections by introducing vortices into the air flow ahead of the trailing element, rather than using discrete protruding vortex generators on the flap itself, thereby overcoming the problems of manufacturing cost, space occupation, maintenance and drag associated with such prior art.

The chevroned pattern/serrations are preferably formed in the plane of the trailing edges and/or in a 'chordwise' direction of the respective leading element, and thereby do not project from the leading element surface, and so there is significantly less associated parasitic drag penalty compared to conventional arrays of discrete vortex generators which protrude from the flap surface. This is particularly important during take-off where the lift:drag ratio needs to be as high as possible. Furthermore, the shaped trailing edges do not introduce any space or size limitations and so the proximity to fixed internal wing structure during deployment is not a limiting factor as with known discrete protruding vortex generator arrays. Also, with the chevroned trailing edge being integral with the wing main body 12, there is no risk of dislodgement or break-off as with known discrete protruding vortex generators.

In addition to the above, since the lower trailing edges are configured to disrupt the air flow and introduce vortices therein before the air passes through the slot, it ensures that the vortices are fully established and entrained prior to the air flow arriving at the leading edge of the respective trailing element. This air flow de-energisation maximises the effectiveness of the wing/high-lift section design at suppressing flow separation over the respective trailing element, thereby optimising the lift provided.

The exact shape of the chevroned pattern on the trailing edges can vary within the scope of the invention—for example, the spacing and depth of the chevrons can be altered to an optimal configuration to suit the specific application. In addition to the above, although the non-linear trailing edge(s) of the wing 10 of the invention are shown and described as having a chevroned or saw-toothed pattern, other patterns are possible within the scope of the invention and which are capable of having the same effect of introducing vortices in the air flow ahead of the respective trailing element to eliminate flow separation over the surface of said trailing element. For example, other configurations of the trailing edge may include alternative serrated patterns or square notched trailing edges. The serrations may extend entirely along the spanwise direction of the respective leading element, or may only extend partially along a section of the leading element in a spanwise direction, for each of the above-described embodiments, within the scope of the invention.

Although the embodiments of the invention shown and described comprise either a wing element having a flap mounted to a trailing edge thereof, or to a wing element with a slat mounted to a leading edge thereof, it is intended that a combination of the two embodiments is to fall within the scope of the invention. Such an un-illustrated embodiment would thereby include a wing element with a flap moveably mounted to a trailing edge thereof, and a slat moveably mounted to a leading edge thereof. In such an embodiment, only the lower trailing edge of one or both of the slat and/or flap could be provided with vortex-generating serrations, or both the upper and lower trailing edges of one or both of the slat and/or flap could be provided with vortex-generating serrations.

Although the primary purpose of the invention is to suppress flow separation from the flaps of high-lift slotted wings, as described above, the invention also has an additional benefit of noise reduction of such wing designs, since the vortices generated in the air flow as described above, improve the mixing of the air flows from different parts of the wing 10. The mixing of different air flows is a major generator of noise from aircraft wings, and so improved mixing of air flows reduces the noise levels associated with the wing design.

The invention claimed is:

1. An aircraft wing comprising:
a fixed leading element comprises:
   an upper trailing edge at the upper side of the wing element; and
   a lower trailing edge on the underside of the wing element; and
a moveable trailing flap element moveably coupled to said leading element, said elements configured relative to each other so that air can flow from the underside of the leading element over the top of the trailing flap element through a gap between the leading element and the flap trailing element, wherein said lower trailing edge of the fixed leading element proximate to the trailing flap element includes a plurality of rigid elements comprising a plurality of spanwise periodic indentations configured to disrupt air flow as air flows through the gap.

2. An aircraft wing according to claim 1 wherein said trailing edge is configured to create vortices in air flow as air flows over said trailing edge and through the gap.

3. An aircraft wing according to claim 1 wherein the upper trailing edge also comprising said plurality of rigid elements configured to disrupt air flow as air flows over said upper trailing edge.

4. An aircraft wing according to claim 1 wherein a cove is formed between the upper trailing edge and the lower trailing edge.

5. An aircraft wing according to claim 4 wherein the flap is moveable between a stowed position and a deployed position in which the flap is spaced from the wing to define said gap, and the flap is located partially within the cove in the stowed position.

6. An aircraft wing according to claim 1 wherein the fixed leading element further comprises a slat moveably coupled to the leading edge of the fixed leading element.

7. An aircraft wing according to claim 6 wherein the slat is moveable between a stowed position in which the slat is disposed adjacent to the fixed wing, and a deployed position in which the slat is spaced from the fixed wing to define a gap between the slat and the fixed wing.

8. An aircraft wing according to claim 7 wherein the slat comprises an upper trailing edge at the upper side thereof and a lower trailing edge on the underside thereof, the lower trailing edge of the slat including a plurality of rigid elements configured to disrupt air flow as air flows over said lower trailing edge of the slat and through the gap between the slat and the fixed wing.

9. An aircraft wing according to claim 8 wherein the upper trailing edge of the slat also includes a plurality of rigid elements configured to disrupt air flow as air flows over said upper trailing edge of the slat.

10. An aircraft wing according to claim 1 wherein the trailing edge comprises serrations.

11. An aircraft wing according to claim 10 wherein the serrations extend at least partially along said trailing edge in a span-wise direction.

12. An aircraft wing according to claim 11 wherein the serrations extend entirely along said trailing edge in a spanwise direction.

13. An aircraft wing according to claim 10 wherein the serrations comprise a triangular saw-tooth configuration.

14. An aircraft wing according to claim 10 wherein the serrations comprise a notched configuration.

15. An aircraft wing according to claim 10 wherein the serrations are formed substantially in the plane of the or each trailing edge surface.

16. An aircraft wing according to claim 10 wherein an imaginary chordline extends between the leading edge and the trailing edge of the fixed wing, and the serrations in the or each trailing edge are formed in a substantially chordwise direction.

17. An aircraft wing comprising:
a leading slat element comprises:
   an upper trailing edge at the upper side of said slat element; and
   a lower trailing edge on the underside of said slat element; and
a trailing fixed wing element, said slat and wing elements moveably coupled together, said slat and fixed wing being positionable relative to each other so that air can flow from the underside of the slat element over the top of the fixed wing element through a gap between the slat element and the fixed wing element, wherein said lower trailing edge at an underside of the slat proximate to the fixed wing includes a plurality of rigid elements comprising a plurality of spanwise periodic indentations configured to disrupt air flow as air flows over said lower trailing edge and through the gap.

18. An aircraft wing according to claim 17 wherein the slat is moveable between a stowed position in which the slat is disposed adjacent to the wing element, and a deployed position in which the slat is spaced from the wing element to define said gap.

19. An aircraft wing according to claim 18 wherein the slat comprises an upper trailing edge at the upper side thereof and a lower trailing edge on the underside thereof, the lower trailing edge being configured to disrupt air flow as air flows over said lower trailing edge and through the gap.

20. An aircraft wing according to claim 19 wherein the upper trailing edge is also configured to disrupt air flow as air flows over said upper trailing edge.

21. An aircraft wing according to claim 17 wherein the trailing edge comprises serrations.

22. An aircraft wing according to claim 21 wherein the serrations extend at least partially along said trailing edge in a span-wise direction.

23. An aircraft wing according to claim 22 wherein the serrations extend entirely along said trailing edge in a span-wise direction.

24. An aircraft wing according to claim 21 wherein the serrations comprise a triangular saw-tooth configuration.

25. An aircraft wing according to claim 21 wherein the serrations comprise a notched configuration.

26. An aircraft wing according to claim 21 wherein the serrations are formed substantially in the plane of the or each trailing edge surface.

27. An aircraft wing according to claim 21 wherein an imaginary chordline extends between the leading edge and the trailing edge of the leading element, and the serrations in the or each trailing edge are formed in a substantially chordwise direction.

28. An aircraft wing according to claim 17 wherein said trailing edge is configured to create vortices in air flow as air flows over said trailing edge and through the gap.

29. A method of suppressing air flow separation over an aircraft wing, said wing comprising a leading element and a trailing element, said elements moveably coupled together, said elements positioned relative to each other so that air can flow from the underside of the leading element over the top of the trailing element through a gap between the leading element and the trailing element, the method comprising the step of disrupting air flow by a plurality of rigid elements comprised of a plurality of spanwise periodic indentations at an underside of said leading element as air flows over a lower trailing edge of said leading element and through the gap.

30. A method according to claim 29 wherein the step of disrupting air flow comprises creating vortices in air flow as air flows over said trailing edge and through the gap.

31. A method of suppressing air flow separation over an aircraft wing comprising a leading slat element and a trailing fixed wing element moveably coupled together, said slat and fixed wing being positionable relative to each other so that air can flow from the underside of the slat over the top of the fixed wing through a gap between the slat and the fixed wing, the method comprising disrupting air flow by a plurality of rigid elements comprising a plurality of spanwise periodic indentations at an underside of the slat as air flows over a lower trailing edge of said slat and through the gap.

32. A method according to claim 31 wherein the step of disrupting air flow comprises creating vortices in air flow as air flows over said trailing edge and through the gap.

33. An aircraft wing suppressing air flow separation over a portion of said wing, said wing comprising:
    a leading wing element;
    a trailing wing element, said elements moveably coupled together, said elements positioned relative to each other so that air can flow from the underside of the leading element over the top of the trailing element through a gap between the leading element and the trailing element; and
    a plurality of rigid elements comprised of a plurality of spanwise periodic indentations at an underside of said leading element as air flows over a lower trailing edge of said leading element and through the gap.

34. A method of suppressing air flow separation over an aircraft wing, said wing comprising:
    a fixed leading element with an upper trailing edge at the upper side of the wing element and a lower trailing edge on the underside of the wing element; and
    a moveable trailing flap element moveably coupled to said leading element, said method comprising the steps of:
    configuring said elements relative to each other so that air can flow from the underside of the leading element over the top of the trailing flap element through a gap between the leading element and the flap trailing element; and
    when said lower trailing edge of the fixed leading element is proximate to the trailing flap element, including a plurality of rigid elements comprising a plurality of spanwise periodic indentations configured to disrupt air flow as air flows through the gap.

* * * * *